United States Patent [19]

Subramanian et al.

[11] Patent Number: 5,489,522
[45] Date of Patent: Feb. 6, 1996

[54] THREE-WAY CATALYSTS FROM ORGANO NOBLE METAL PRECURSORS

[75] Inventors: Somasundaram Subramanian, Melvindale; Mohinder S. Chattha, Northville, both of Mich.

[73] Assignee: Ford Motor Company, Dearborn, Mich.

[21] Appl. No.: 185,618

[22] Filed: Jan. 24, 1994

Related U.S. Application Data

[62] Division of Ser. No. 986,226, Dec. 7, 1992, abandoned.

[51] Int. Cl.$^6$ .............................. B01D 53/56; B01J 23/40
[52] U.S. Cl. ...................... 423/213.5; 502/333; 502/334; 502/339
[58] Field of Search ........................ 423/213.5; 502/333, 502/334

[56] References Cited

U.S. PATENT DOCUMENTS

| | | | |
|---|---|---|---|
| 3,860,664 | 1/1975 | Yates | 502/169 X |
| 3,904,692 | 9/1975 | Lassau | 502/103 X |
| 3,969,270 | 7/1976 | Lester | 502/328 |
| 4,123,391 | 10/1978 | Noguchi | 502/328 X |
| 4,384,133 | 5/1983 | Miyazaki et al. | 502/333 X |
| 4,616,093 | 10/1986 | Kapicak | 502/333 X |
| 4,786,623 | 11/1988 | Grenouillet et al. | 502/164 |
| 4,857,656 | 8/1989 | Kouge | 558/271 |
| 4,889,949 | 12/1989 | Grenouillet et al. | 502/154 |
| 4,927,957 | 5/1990 | Perron | 502/164 X |
| 4,943,550 | 7/1990 | Kolts et al. | 502/327 |
| 5,217,939 | 6/1993 | Campbell | 502/339 |

OTHER PUBLICATIONS

Dao et al., "Hydrogenation of carbon dioxide over catalysts prepared from complexes of Group VIII Metals," *Polish J. Chem.*, 58, 817–22 (1984).

Dao et al., "Hydrogenation of $CO_2$ Over Catalysts Prepared from complexes of VIII Group Metals," *Polish J. Chem.*, 58, 823–27 (1984).

Russell, A., *Technical Paper No. 10, Alumina Properties,* Alcoa, 1953.

*Primary Examiner*—Anthony McFarlane
*Attorney, Agent, or Firm*—Lorraine S. Melotik; Roger L. May

[57] ABSTRACT

The invention is directed to a method for enhancing the catalytic effectiveness of noble metal catalysts to reduce $NO_x$ and to oxidize hydrocarbons, which comprises: providing a solution of an organo noble metal compound dissolved in an organic solvent; impregnating a support material, preferably comprising at least 50% by weight γ-alumina, with the solution; and heating the impregnated support material to evaporate the solvent and eliminate the organo group leaving the coated support material with the noble metal.

11 Claims, 3 Drawing Sheets

THREE-WAY CATALYSTS FROM ORGANO NOBLE METAL PRECURSORS

This is a Division of application Ser. No. 07/986,226, filed Dec. 7, 1992, now abandoned.

BACKGROUND OF THE INVENTION

This invention relates to the art of making noble metal catalysts useful in the oxidation of hydrocarbons and reduction of nitric oxides contained within the exhaust stream of an internal combustion engine, and more particularly to the use of carboxylates of such noble metals for enhancing the conversion efficiency of the catalyst metals.

Noble metal compounds have been used in the making of oxidation catalysts for some time. Typically, impregnation solutions for depositing the noble metal catalyst on a support are prepared from inorganic salts of such noble metals, e.g., from solutions of compounds like $PdCl_2$, $Pd(NO_3)_2$, $H_2PtCl_6$, and $RhCl_3$.

The use of such inorganic acid salt precursors has some disadvantages. For example, if the $Cl^-$ (or $NO_3^-$) ions are not removed from the support, corrosive compounds such as HCl (or $HNO_3$) may be formed during catalyst use. This may result in corrosion of metallic units downstream of the catalyst. From the perspective of automotive applications, production of HCl may lead to corrosion of the exhaust pipe. The removal of the chloride and nitrate by methods such as reduction or thermal treatment is cumbersome and expensive.

Another disadvantage of inorganic salt precursors results from the fact that catalyst support materials like aluminum oxide, $Al_2O_3$, and lanthanum oxide, $La_2O_3$, dissolve in highly acidic solutions. Solutions of compounds like $PdCl_2$, $H_2PtCl_6$, or $RhCl_3$ are highly acidic in nature; typically the pH of these solutions is lower than 2.0. Thus in providing the noble metal catalyst on the support from such inorganic salt solutions, a fraction of the support material will be dissolved and redeposited along with the dissolved noble metal ions. This leads to morphological changes in the catalyst due to alloy formation between the noble metal and the support material metal atoms.

It would be desirable to provide impregnation solutions of soluble noble metal catalysts which avoid the above disadvantages. The present invention provides solutions of organo noble metal catalyst salts which overcome the problems associated with conventional acidic inorganic salt solutions.

SUMMARY OF THE INVENTION

The invention is directed to a method for enhancing the catalytic effectiveness of noble metal catalysts to reduce $NO_x$ and to oxidize hydrocarbons, which comprises: providing a solution of an organo noble metal compound dissolved in an organic solvent; impregnating a support material, preferably comprising at least 50% by weight γ-alumina, with the solution; and heating the impregnated support material to evaporate the solvent and eliminate the organo group leaving the coated support material with the noble metal.

Preferably the organo group is selected from carboxylate comprising 3–19 carbon atoms and alkylcarbonyl, most preferably being ethylhexanoate. The support materials are preferably granular γ-alumina, more preferably further including lanthana. The noble metal is generally loaded on the support in an amount of 0.1–5.0% by the weight of the entire catalyst, including the support material. Preferably, the heating step is carried out in two stages: first by heating to 320° C. for about one hour, and then to 600° C. for about four hours.

The product resulting from the practice of the present method is a noble metal catalyst characterized by (i) a lower light-off temperature for hydrocarbon oxidation at or above 50% conversion efficiency, and (ii) improved reduction of $NO_x$. Upon thermal aging, these catalysts continue to perform better than those conventionally deposited as inorganic salts of these noble metals. Employing organo-noble metal catalysts precursors made according to the present method leaves the catalyst support material with more free noble metal (not alloyed) catalyst on the surface and also larger noble metal particles, both of which are believed to provide improved properties of the invention catalyst. These advantages are believed to result, in part, from the fact that the pH of the solutions of the organo compounds are in the substantially neutral range of about 6–8. Additionally, since the organo group is decomposed to $CO_2$ and $H_2O$ during the heating step, the above disadvantages inherent with the use of conventional noble metal inorganic salts, e.g., chlorides, are avoided.

DETAILED DESCRIPTION OF PREFERRED EMBODIMENTS

Figure 1:
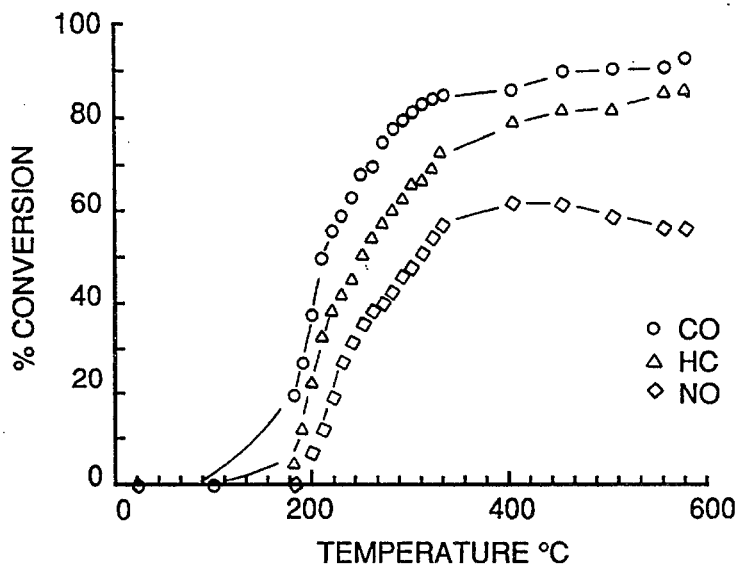
FIG. 1 graphically illustrates light-off characteristics (conversion versus temperature) for the removal of HC, CO, and $NO_x$ from a simulated combustion engine exhaust gas stream over a 1% Pd/15% $La_2O_3/Al_2O_3$ catalyst prepared according to an embodiment of the present invention from Pd 2-ethyl hexanoate.

The method of this invention comprises providing a solution of an organo noble metal compound dissolved in organic solvent. This solution is employed to impregnate a support material, preferably comprising mainly γ-alumina, after which the impregnated support material is heated to evaporate the solvent and eliminate the organo group. This then leaves the support material with a surface coating of the noble metal.

The noble metal may be selected from palladium, platinum or rhodium. Preferably the noble metal employed in this invention is palladium. Any organo compound of a noble metal which is soluble in an organic solvent and whose organo group is capable of being decomposed by heat to leave only the noble metal or the oxide of the noble metal on the support material may be employed in this inventions. Decomposition of the organo group yields $CO_2$ and $H_2O$. Included in this group are noble metal carboxylates and noble metal alkylcarbonyls, the organo portion being carboxylate and alkylcarbonyl, respectively. Mixtures of such organo noble metal compounds may also be used. Noble metal carboxylates employed in the invention preferably are those having between 3–19 carbon atoms such as propionate, ethylhexanoate, napthanoate, benzoate, palmitate, and stearate may be used. Noble metal alkylcarbonyl employed in the invention preferable are 2,4-pentanedionates, and acetylacetonates of Pd, Rh, and Pt. Other such organo materials are known to those skilled in the art.

The organo noble metal is dissolved in an organic solvent to make a solution thereof. Exemplary of such organic solvents are toluene, isopropyl alcohol, acetone, methylethylketone, butylacetate, mineral spirit heptane, and dimethylformamide. The organo noble metal compound is generally not isolated in pure form. The solution of the organo noble metal compound as prepared is generally further diluted for impregnation. Generally to form the catalyst solution, the organo compound is simply mixed into the solvent, which may be further diluted with additional organic solvent. The solution may also comprise a mixture of compatible organic solvents.

The dissolved organo noble metal compound is subsequently provided on support material which is at least 50% by weight γ-alumina, and may include any of the other refractory oxide materials such a silica, titania, or zirconia, by impregnating it with the solution. γ-alumina is a dominant or substantial ingredient of the support (at least 50% by weight) because it has high surface area, good adhesion, and low precious metal/support chemical interaction. The support may however comprise any of the other materials hereinbefore disclosed. In addition, this support may comprise in admixture materials such as lanthana, barium oxide or ceria.

"Support" is used herein to mean a material having a high surface area per unit volume and a good adhesion for precious metal applied thereto; "carrier" is used herein to mean a material having a low surface area per unit volume; "catalyst" or "catalyst construction" is used herein to mean the aggregation of support and catalytic compound excluding the carrier. A mechanical carrier is preferably comprised of a monolithic magnesium aluminum silicate structure (i.e., cordierite), although the configuration of which is not critical to the catalyst of this invention. The volume of the structure is measured by its exterior dimensions. It is preferred that the micropore volume of the silicate material be relatively low and the macropore volume provide at least about 90% with pore diameters greater than 2000 angstroms. The surface area of the carrier, as opposed to the material of which the structure is made, should be maximized consistent with pressure drop limitations for the particular application of the catalytic system of this invention. It is preferred that the surface area of the monolithic structure provide 50–1000 meter square per liter structure, as measured by $N_2$ adsorption. Cell density should be maximized consistent with pressure drop limitations and is preferably in the range of 200–800 cells per square inch of cross-sectional area of the structure.

Coating of the support material is carried out to impart preferably 0.1–5% of the noble metal catalyst-on the support. The support material comprising γ-alumina generally is employed in granular form and has a particle size in the range of 20–100 mesh (although particle size is not critical). In the case of a granular support, a mixture of the granular material and solution is stirred continuously at an elevated temperature, generally of about 75°–120° C., to evaporate the solvent. The impregnated support material is then heated to decompose and eliminate the organo group from the mixture, such as by heating to 320° C. for one hour and thereafter for four hours at 600° C. The organo group will decompose to $H_2O$ and $CO_2$. The coating may be put directly on a monolith coated with a support material like γ-alumina.

To test the effectiveness of the modified catalyst of this invention, a catalyst with and without the features of this invention were tested in a flow reactor for removal of hydrocarbons, carbon monoxide and nitric oxide, as shown in the Figures and described in the following examples.

EXAMPLE 1

γ-alumina (Alumina-C, Degussa Corp.) is made into a slurry in acidified (4% $HNO_3$) water. The slurry is dried at 110° C. overnight and then calcined at 600° C. for four hours. It is then crushed and sieved to obtain a fraction of 20–40 mesh particle size. One hundred grams of this material is placed in a beaker and a solution 39.8 g lanthanum hydrate in 126 ml water was added with continuous stirring to completely wet the particles (incipient wetness). The mixture is placed at 50° C. overnight and is then dried at 110° C. for four hours. It is calcined at 450° C. for five hours to provide a lanthana-alumina composite oxide support material.

Sample A: A solution of $PdCl_2$ in dilute nitric acid containing 0.1 g Pd, is diluted with water to 13 ml and 10 g of the above lanthana-alumina composite oxide is impregnated with this solution by incipient wetness procedure. The material is allowed to stay at room temperature overnight, dried at 120° C. and calcined at 600° C. for four hours.

Sample B: A toluene solution of palladium-2-ethylhexanoate (10% by weight in Pd) containing 0.1 g Pd, is diluted with isopropyl alcohol to 13 ml volume. Ten grams of the lanthana/alumina composite oxide described above are impregnated with this solution by incipient wetness technique. The resulting material is dried at 120° C. for two hours and calcined at 320° C. for one hour and at 600° C. for four hours.

Figure 2:
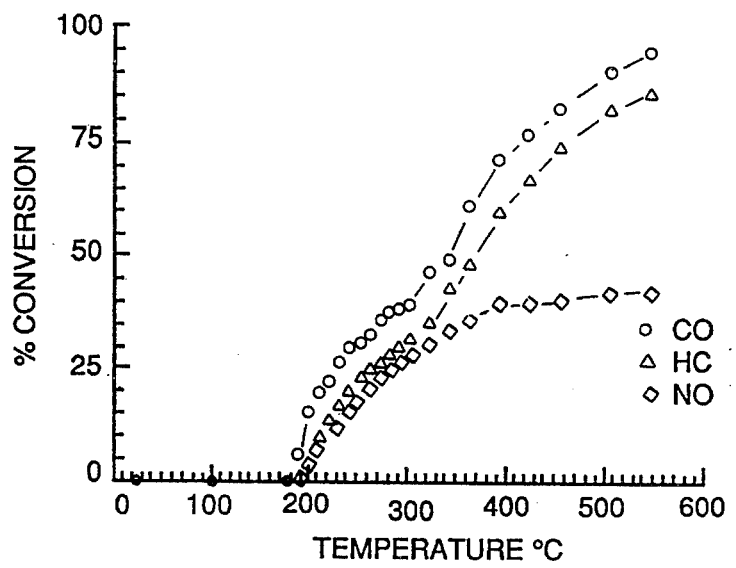
FIG. 2 graphically illustrates, for comparison to FIG. 1, light-off characteristics (conversion versus temperature) for the removal of HC, CO, and $NO_x$ from a simulated vehicle exhaust stream over a 1% Pd/15% $La_2O_3/Al_2O_3$ catalyst prepared from $PdCl_2$.
Figure 3:
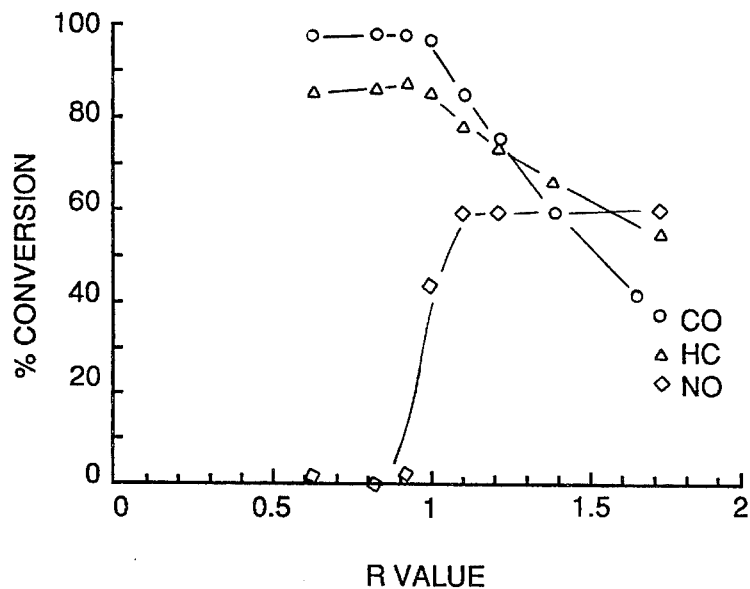
FIG. 3 graphically illustrates redox data (conversion versus redox ratio) for the removal of HC, CO, and $NO_x$ from a simulated vehicle exhaust stream over a 1% Pd/15% $La_2O_3/Al_2O_3$ catalyst prepared according to an embodiment of the present invention from Pd 2-ethyl hexanoate.
Figure 4:
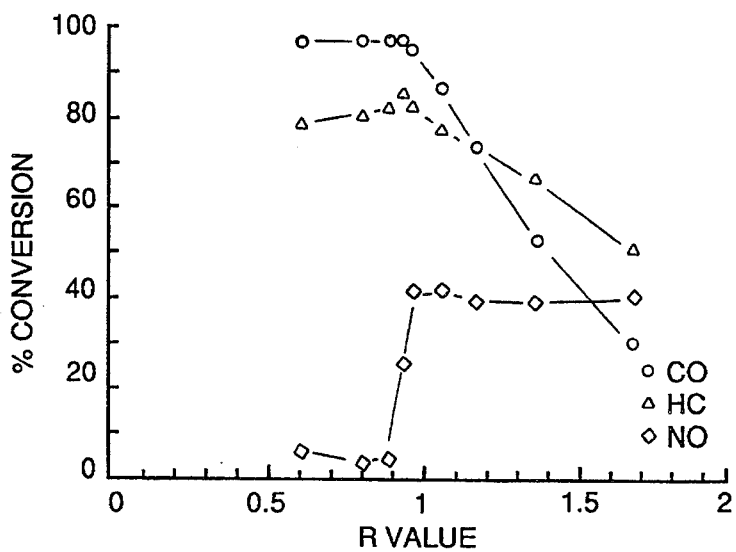
FIG. 4 graphically illustrates, for comparison to FIG. 3, redox data (conversion versus redox ratio) for the removal of HC, CO and $NO_x$ from a simulated vehicle exhaust stream over a 1% Pd/15% $La_2O_3/Al_2O_3$ catalyst prepared from $PdCl_2$.
Figure 5:
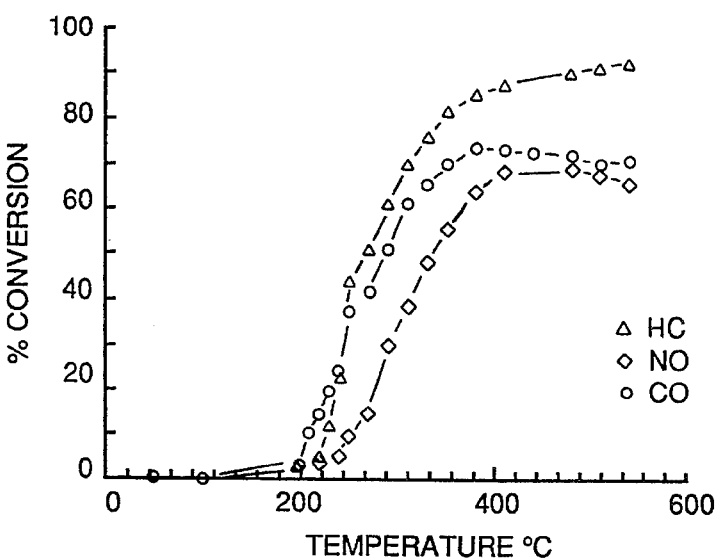
FIG. 5 graphically illustrates light-off characteristics (conversion versus temperature) for the removal of HC, CO and $NO_x$ from a simulated vehicle exhaust stream over a 1% Pd/$Al_2O_3$ catalyst prepared according to an embodiment of the present invention from Pd 2-ethyl hexanoate.
Figure 6:
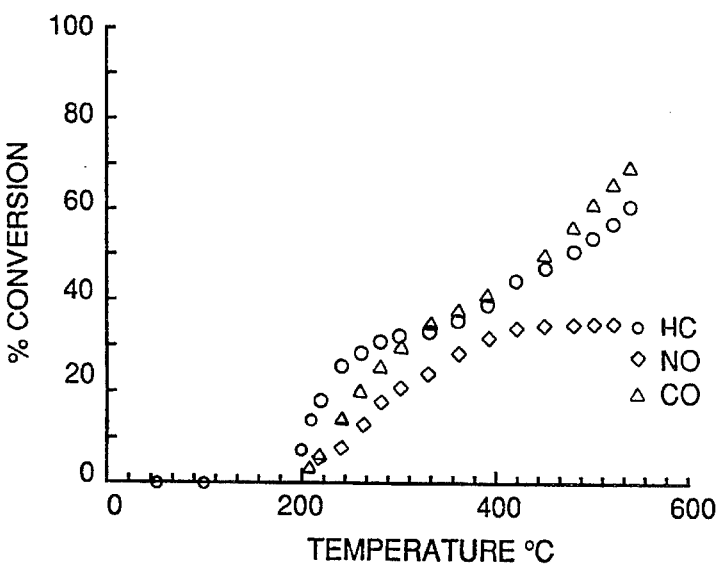
FIG. 6 graphically illustrates, for comparison to FIG. 5, light-off characteristics (conversion versus temperature) for the removal of HC, CO, and $NO_x$ from a simulated vehicle exhaust stream over a 1% Pd//$Al_2O_3$ catalyst prepared from $PdCl_2$.
Figure 7:
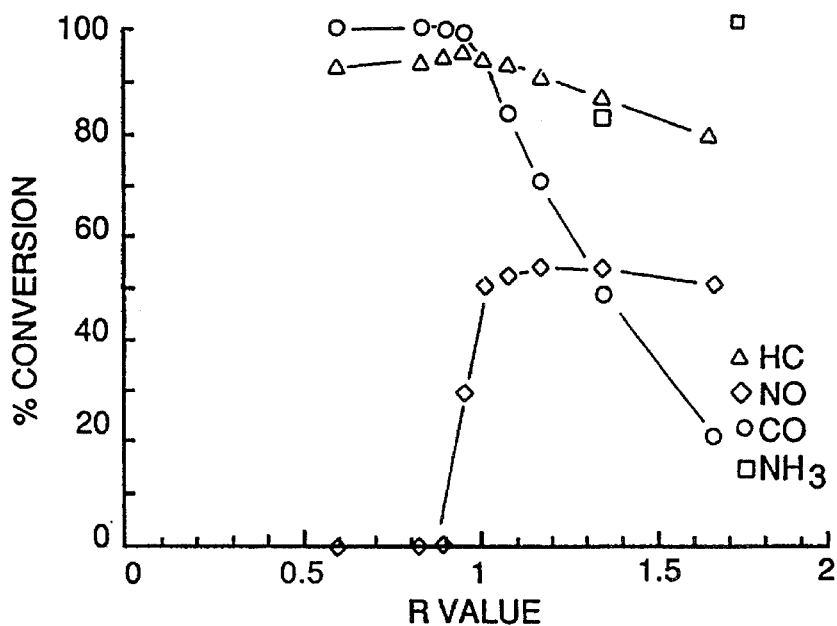
FIG. 7 graphically illustrates redox data (conversion versus redox ratio) for the removal of HC, CO, and $NO_x$ from a simulated vehicle exhaust stream over a 1% Pd/$Al_2O_3$ catalyst prepared according to an embodiment of the present invention from Pd 2-ethyl hexanoate.
Figure 8:
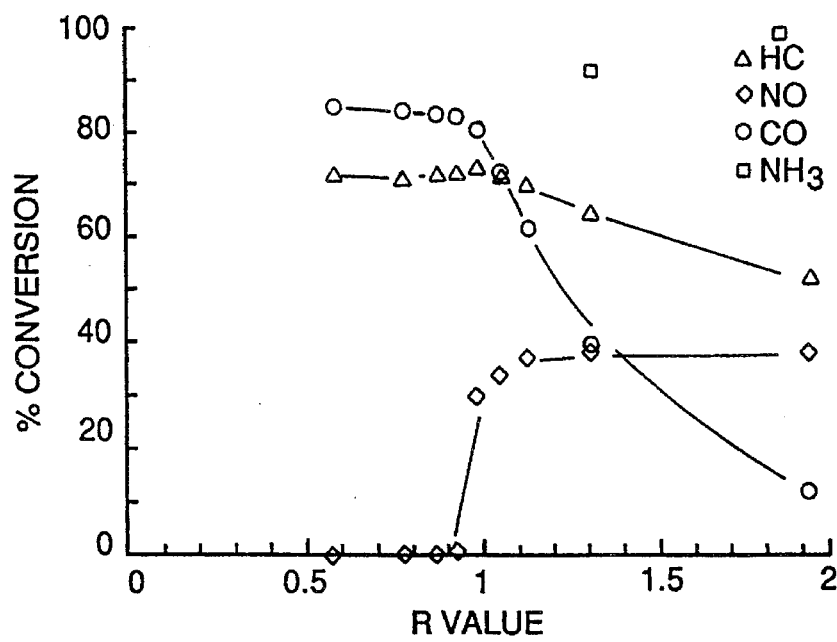
FIG. 8 graphically illustrates, for comparison to FIG. 7, redox data (conversion versus redox ratio) for the removal of HC, CO, and $NO_x$ from a simulated vehicle exhaust stream over a 1% Pd/$Al_2O_3$ catalyst prepared from $PdCl_2$.

The catalysts are evaluated on a flow reactor. The redox measurements are conducted at 500° C. using a simulated combustion engine exhaust gas stream comprising 1000 ppm NO, 1.5% CO, 0.5% $H_2$, 20 ppm $SO_2$, 1000 ppm $C_3H_6$, 500 ppm $C_3H_8$ and 0.6 to 3.2% $O_2$. The light-off experiments are conducted using a gas comprising 1000 ppm NO, 1.5% CO, 0.5% $H_2$, 1000 ppm $C_3H_6$, 20 ppm $SO_2$, and 500 ppm $C_3H_8$. The temperature is varied and the redox ratio of the feed gas is 1:02. These conditions are typically used to simulate automobile vehicle exhaust situations. The light-off for catalysts A and B data (R-1.02) are shown in FIG. 1 (catalyst B— PdEtH) and FIG. 2 (catalyst A—$PdCl_2$). The light-off temperature is the temperature at which 50% conversion is achieved. The HC and CO light-off temperatures for present invention catalyst B (i.e., 251° C., 212° C., respectively) are desirably lower than those of comparative conventional catalyst A (367° C., 343° C., respectively). Catalyst B shows 50% NO conversion at 307° C. whereas catalyst A does not provide 50% NO conversion in the temperature range investigated. The redox data are shown in FIG. 3 and FIG. 4. The redox ratio, R, is the ratio of reducing components to oxidizing components in the catalyst feed gas and is hence a measure of the air-fuel ratio.

The present invention catalyst prepared using Pd-EtH shows significantly higher NO conversion in the fuel rich (R>1 or net reducing) region. A marginal improvement in CO and HC conversion is also observed. It is observed that the activity (conversion at different redox ratios as well as light-off temperature) of present invention catalyst B (prepared from Pd-EtH) is higher than that of comparative catalyst A. It is speculated that the Pd particle size distribution of catalyst B is different from that of catalyst A. The differences in the particle size distributions may affect the nature of Pd-La interactions and this could result in higher activity.

EXAMPLE 2

Two catalysts: A ($PdCl_2$) and B (PdEtH) are prepared on γ-alumina (20–40) mesh substrate as described in Example 1. Both the catalysts contain 1% Pd loading by weight; they are evaluated according to the procedure outlined in Example 1. The light-off temperature and the conversions are shown in FIGS. 5, 6, 7 and 8.

EXAMPLE 3

Lanthana-alumina composite oxide is prepared as described in Example 1 by employing half the amount of lanthanum nitrate (19.9 g for 100 g alumina). Catalyst samples A ($PdCl_2$) and B (Pd 2-ethylhexanoate) are prepared and evaluated as described in Example 1. Hydrocarbon light-off temperature for catalyst A is 362° C. while for B is 249° C.

EXAMPLE 4

The catalysts A and B described in Example 1 are heated at 1000° C. for 16 hours in stagnant air and are evaluated for hydrocarbon oxidation as described in Example 1. The hydrocarbon light-off temperature for catalyst A is 369° C. while for B it is 256° C.

EXAMPLE 5

γ-alumina particles described in Example 1 are first impregnated with barium nitrate solution by incipient wetness to impart 1% barium oxide on alumina. Lanthana is subsequently deposited on this composite oxide as described in Example 1. Two samples, A ($PdCl_2$) and B (PdEtH), are prepared and evaluated as described in Example 1. The hydrocarbon light-off for sample A is 366° C. and that of B is 253° C.

EXAMPLE 6

γ-alumina particles (20–40 mesh) are first impregnated with cerium nitrate solution by incipient wetness according to the procedure of Example 1 to deposit 1.2% ceria on the γ-alumina. Lanthana is then deposited on the particles as described in Example 1. Two catalyst samples A ($PdCl_2$) and B (PdEtH), are prepared as described in Example 1 to deposit 2% by weight of Pd on each sample. The hydrocarbon light-off temperature of A is 361° C. while that of B is 247° C.

EXAMPLE 7

Samples are prepared as described in Example 1 with the difference that the γ-alumina particles contained 5% titania by weight and the palladium loading of both the samples is 0.5% by weight. The hydrocarbon light-off temperature for A is 376° C. and for B 357° C.

EXAMPLE 8

Sample A and B are prepared as described in Example 2 with the only difference that impregnating solution for A additionally contains chloroplatinic acid and that for B additionally contains platinum 2-ethylhexanoate dissolved in it. Both the samples have palladium loading of 1% and platinum loading of 0.25% by weight. The samples are evaluated as described in Example 1. The light-off temperature for sample A is 369° C. while for B is 252° C.

EXAMPLE 9

Rhodium chloride is dissolved in the impregnation for sample A and rhodium 2-ethylhexanoate solution is added to impregnation for sample B described in Example 8. The metal loading in both the samples is Pd 1%, Pt 0.25%, and Rh 0.1% by weight. The samples are evaluated as described in Example 1. The hydrocarbon light-off temperature and NO conversion at stoichiometric redox ratio for sample A are 363° C. and 69% while for sample B they are 249° C. and 71%.

EXAMPLE 10

A cordierite monolith honeycomb containing 30% γ-alumina and 3% lanthana by weight as washcoat is impregnated with solutions described in Example 9 to prepare samples A and B. The metal loading on both the samples is Pd 1%, Pt 0.25%, and Rh 0.1% by weight of the washcoat. The samples are evaluated at a space velocity of ~45,000 $hr^{-1}$ under the conditions described in Example 1. The light-off temperature and NO conversion at stoichiometric redox ratio for sample A are, respectively, 359° C. and 81% while for sample B are, respectively, 248° C. and 87%.

EXAMPLE 11

Catalysts A and B are prepared as described in Example 1 for palladium chloride solution and from palladium 2-ethylhexanoate solution employing γ-alumina (surface area 10.5 $m^2/g$) as substrate. The metal loading in both the catalysts is 0.5% Pd by weight. The hydrocarbon light-off temperature for catalysts A and B is 366° C. and 359° C., respectively.

EXAMPLE 12

Catalysts A and B are Prepared as described in Example 1 but instead using zirconia (surface area 19 m²/g) as support. The hydrocarbon light-off temperature for A is 365° C. while for B is 250° C.

EXAMPLE 13

Lanthana-alumina composite oxide is prepared as described in Example 1 by employing 38.8 g of lanthanum nitrate for 100 g of alumina. Catalyst samples A (PdCl$_2$) and B (Pd 2,4-pentanedionate dissolved in dimethylformamide) are prepared and evaluated as described in Example 1. Both samples contain 1% Pd by weight. Hydrocarbon light-off temperature for catalysts A and B was 361° C. and 248° C., respectively. The NO conversion at the stoichiometric point is 39 and 42 percent, respectively.

EXAMPLE 14

Catalysts A and B are prepared as described in Example 13 with the only difference that impregnation solution of A contains chloroplatinic acid and that for B contains Pt 2,4-pentanedionate dissolved in it. Both samples have Pd and Pt loadings of 1% and 0.25% by weight, respectively. The samples are evaluated as described in Example 1. The light-off temperatures for samples A and B are 365° C. and 247° C., respectively. The NO conversion at the stoichiometric point is 38 and 42 percent respectively.

What is claimed is:

1. A process for reducing the emission of exhaust gases produced by an internal combustion engine, which process comprises:

passing said exhaust gases over a catalyst made by a method which consists essentially of:

providing a solution of an organo noble metal compound dissolved in an organic solvent;

impregnating a support material, comprising at least 50% by weight γ-alumina, with said solution; and heating said impregnated support material to evaporate said solvent and eliminate the organo group leaving said support material with a surface coating of said noble metal.

2. A method according to claim 1, wherein said noble metal is selected from the group consisting of palladium platinum and rhodium.

3. A method according to claim 1, wherein the organo group is selected from carboxylates comprising 3–19 carbon atoms and alkylcarbonyl compounds of said noble metals.

4. A method according to claim 1, wherein said carboxylate is selected from propionate, ethylhexanoate, napthanoate, benzoate, palmitate, and stearate.

5. A method according to claim 1, wherein said alkylcarbonyl is selected from acetylacetonates and 2, 4-pentanedionates.

6. A method according to claim 1, wherein said noble metal carboxylate comprises palladium-2 ethylhexanoate.

7. A method according to claim 1, wherein said support material is selected from alumina, zirconia, titania, lanthana, ceria, barium oxide, and mixtures thereof.

8. A method according to claim 7, wherein said support material comprises at least 50% by weight γ-alumina having a particle size mesh of about 20–100.

9. A method as in claim 1, in which said noble metal is loaded on said support material in the amount of 0.1–5.0% by weight of the entire catalyst, including said support.

10. The method as in claim 1, in which said heating to evaporate the solvent consisting essentially of the heating to a temperature of about 320° C. for one hour.

11. A method as in claim 1, in which said heating to eliminate the organo group consisting essentially heating to about 320° C. for one hour followed by heating at 600° C. for about four hours.

* * * * *